July 18, 1933. J. B. BACON 1,918,890
SURGICAL DEVICE
Filed Aug. 8, 1932 4 Sheets-Sheet 1
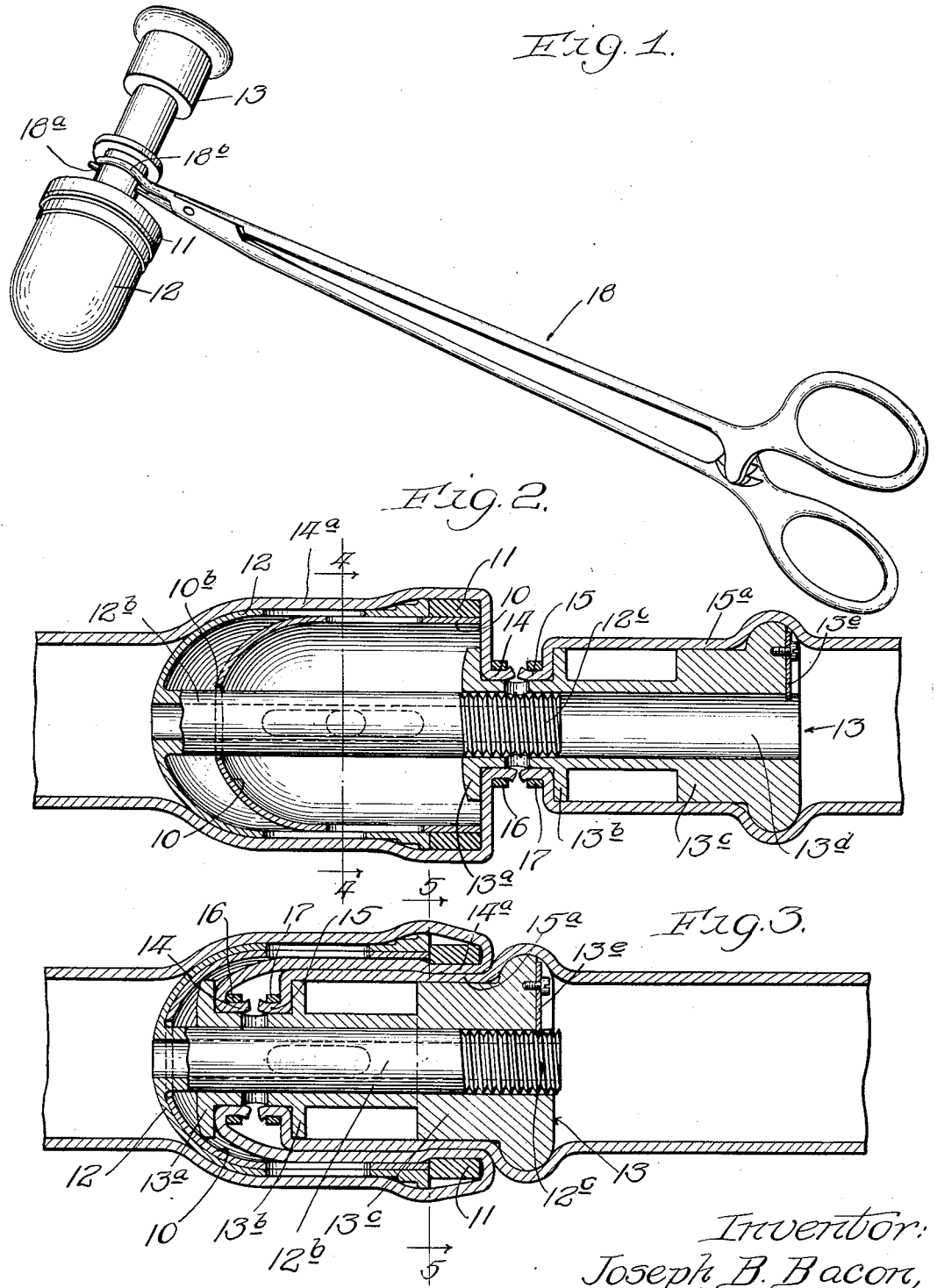
Inventor:
Joseph B. Bacon,
By Lynnforth, Lee, Clinton & Niles,
Attys.

July 18, 1933. J. B. BACON 1,918,890
SURGICAL DEVICE
Filed Aug. 8, 1932 4 Sheets-Sheet 2

Inventor:
Joseph B. Bacon,
By Dynaforth, Lee, Chritton & Wiles
Attys.

July 18, 1933. J. B. BACON 1,918,890
SURGICAL DEVICE
Filed Aug. 8, 1932 4 Sheets-Sheet 3
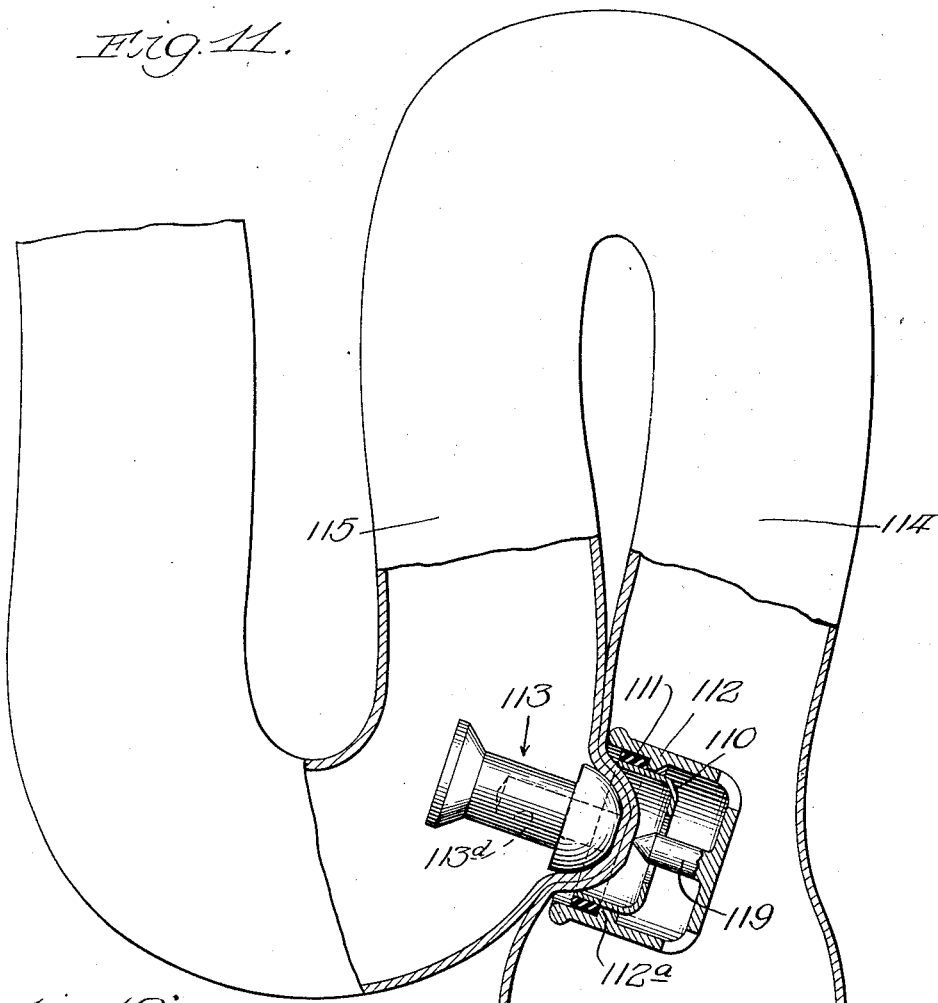
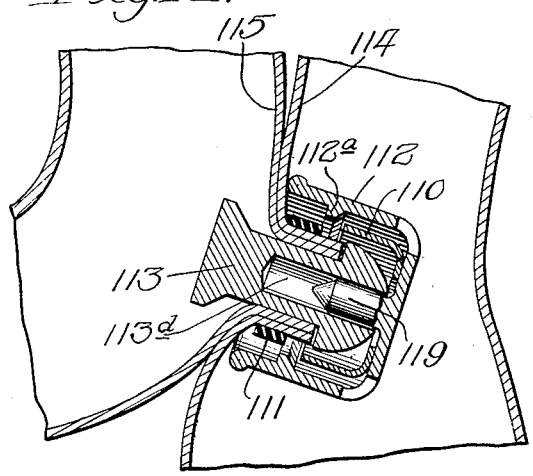
Inventor:
Joseph B. Bacon,
By Dynrenforth, Lee, Chritton & Wiles,
Attys.

Inventor:
Joseph B. Bacon,
By Wynnforth, Lee, Chritton & Wiles,
Attys.

Patented July 18, 1933

1,918,890

UNITED STATES PATENT OFFICE

JOSEPH B. BACON, OF MACOMB, ILLINOIS

SURGICAL DEVICE

Application filed August 8, 1932. Serial No. 627,974.

This invention relates to improvements in surgical devices and, more especially, such a device or instrument especially adapted for operating on rectal stricture. By the use of my improved device the operations of anastomosis, approximation and uniting of severed ends or adjacent portions of the intestines may be accomplished in a substantially aseptic manner.

By the use of my improved device, also, the uniting of the intestinal walls is accomplished through pressure atrophy, without the use of sewing or stitching.

Other features and advantages of my invention will appear more fully as I proceed with my specification.

Figure 4:
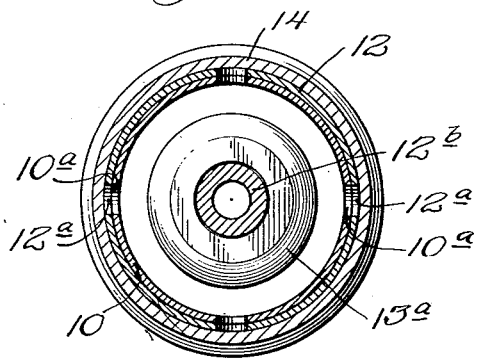
Figure 5:
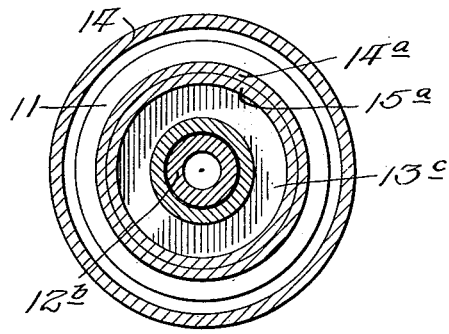
Figure 6:
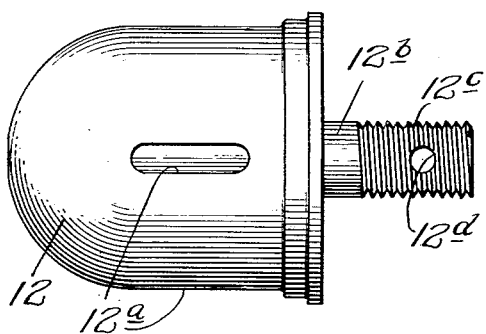
Figure 7:
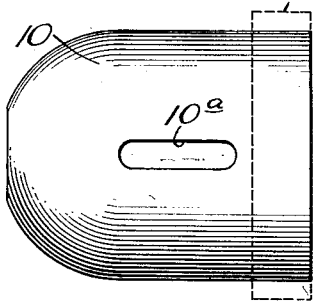
Figure 8:
Figure 9:
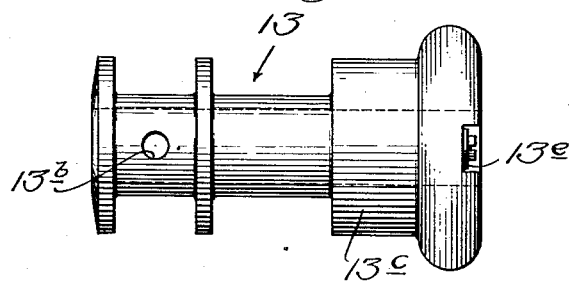
Figure 10:
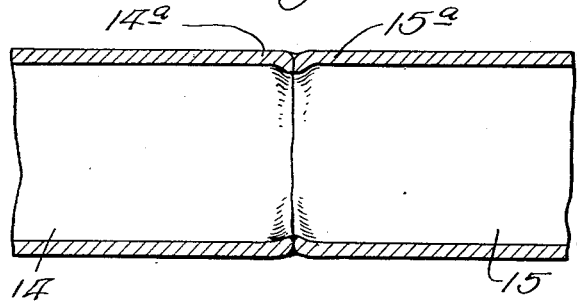
Figure 13:
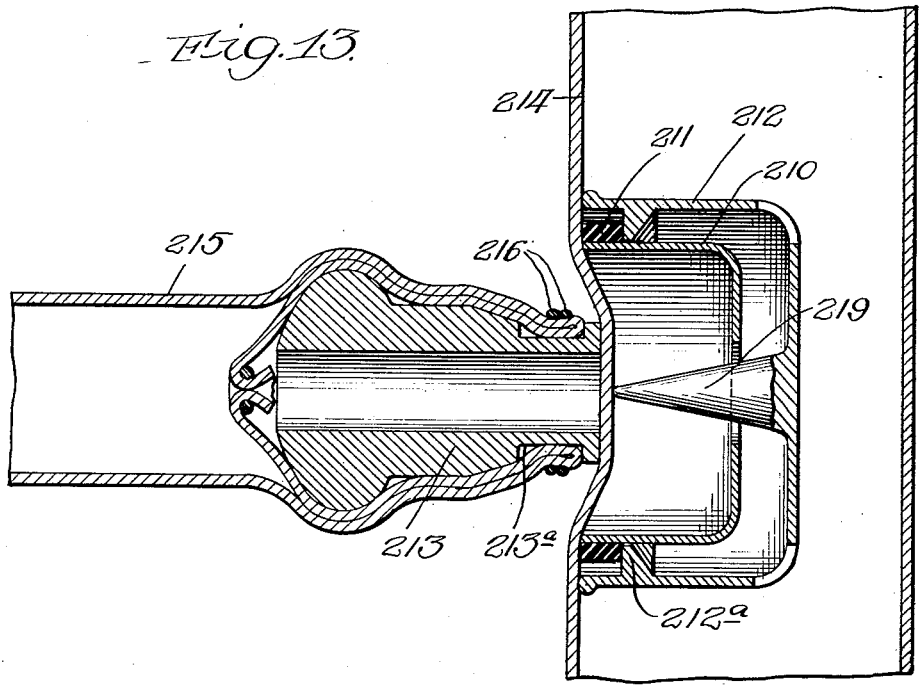
Figure 14:
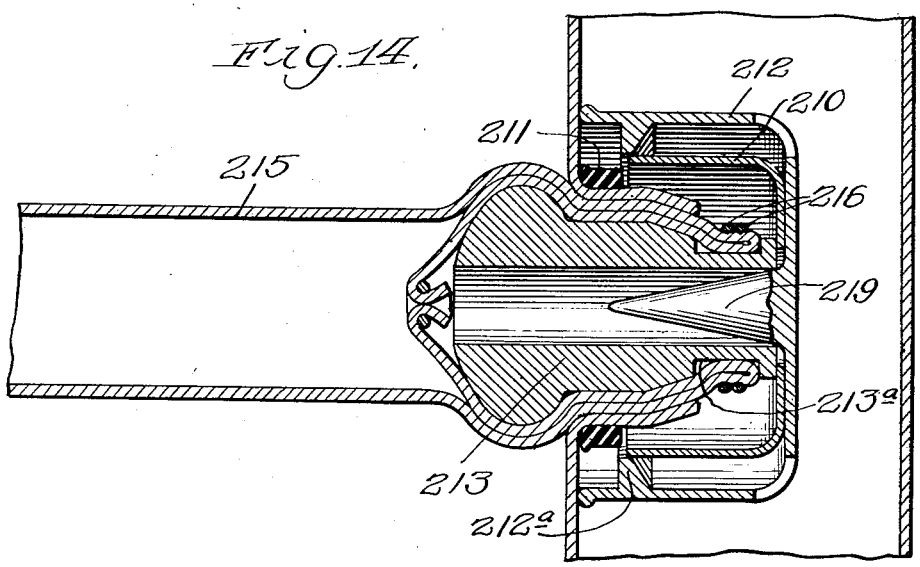

In those forms of devices embodying the features of my invention shown in the accompanying drawings:

Figure 1 is a view in perspective showing the device in a holder; Fig. 2 is an enlarged vertical sectional view; Fig. 3 is a similar view showing the parts in a different position; Fig. 4 is a view taken as indicated by the line 4 of Fig. 2; Fig. 5 is a view taken as indicated by the line 5 of Fig. 3; Fig. 6 is a view in side elevation of the outer cylinder; Fig. 7 is a view in side elevation of the inner cylinder; Fig. 8 is a view in side elevation of the elastic clasp ring removed from the inner cylinder; Fig. 9 is a view in side elevation of the piston; Fig. 10 is a vertical sectional view of the ends of a severed intestine after being joined by the use of the improved device; Fig. 11, a vertical sectional view showing a side-to-side anastomosis of the large intestine; Fig. 12 is a view similar to Fig. 11 showing the parts in a different position; Fig. 13 is a vertical sectional view showing an end-to-side anastomosis; and Fig. 14 is a view similar to Fig. 13 showing the parts in a different position.

For the purpose of illustrating the invention, I have shown the device as used in three different operations; first, an end-to-end approximation of the large or small intestine; secondly, a side-to-side anastomosis of the large intestine; and thirdly, an end-to-side anastomosis of the small to the large intestine. The general principle of the invention is the same in all of these operations, although the device itself is somewhat modified in the different cases.

Before describing the particular construction and use of the device in each of the operations, it may be well to state that in all of them it comprises in general a hollow inner cylinder adapted to support an elastic ring, an outer cylinder adapted to be telescoped over the inner cylinder to remove the ring therefrom, and a hollow piston adapted to carry the intestinal walls to be joined. In the end-to-end approximation, the ends of the intestinal walls are fastened to the piston by purse strings. In the end-to-side anastomosis, the end of the small intestine is similarly fastened to the piston. In the side-to-side anastomosis, both walls are merely placed over the end of the piston and when the latter is inserted into the cylinders, these walls are folded back over the piston. The piston is inserted into the cylinders carrying the walls with them and forced against the inner cylinder to completely telescope the cylinders and cause the outer cylinder to push the ring off of the end of the inner cylinder. When the ring is thus removed from the inner cylinder, it clasps the intestinal walls over the piston and is permitted to remain in this position until the adjacent walls, squeezed against the piston under the ring, join together by pressure atrophy.

I shall now describe the device shown in Figs. 1 to 10, inclusive, illustrating the practice of the invention in an end-to-end approximation of either the large or small intestine. As shown in these figures, 10 indicates the inner cylinder carrying the elastic ring 11. Telescoped over this cylinder is the outer cylinder 12. As shown in Fig. 2, the end of the outer cylinder 12 is against the ring 11 so that completion of the telescoping of the cylinders will operate to remove the ring from the supporting cylinder 10, as shown in Fig. 3. 13 indicates a piston with the spaced flanges 13$^a$ and 13$^b$ near one end thereof. The two ends 14 and 15, respectively, of a severed artery are adapted to be attached to the piston 13 between the flanges 13$^a$ and 13$^b$ by the purse strings 16 and 17, as shown in Fig. 2. In completing the operation, the piston is forced into the cylinders as shown in Fig. 3 to complete the telescoping of the same. This causes the outer cylinder 12 to remove the elastic ring 11 from the inner cylinder whereupon it clasps the walls 14ª and 15ª of the intestines under it and over the enlarged portion 13ᶜ of the piston 13. The walls 14ª and 15ª being thus squeezed together under the elastic ring heal or grow together to unite the same, as shown in Fig. 10. The device can then be moved through the intestine and be removed. As shown in the drawings, the inner cylinder 10 may be provided with openings 10ª and the outer cylinder 12 may have similar openings 12ª. The outer cylinder 12 is provided with a hollow stem 12ᵇ extending through a hole 10ᵇ in the inner cylinder. The end of the stem 12ᵇ is threaded, as indicated by 12ᶜ. The piston 13 is provided with a bore 13ᵈ to accommodate the stem 12ᵇ and at the outer end of this bore is arranged a spring catch 13ᵉ adapted to engage the threads 12ᶜ as the piston is forced home. The spring catch will ride over the threads as the piston is pushed into the cylinders, but will prevent withdrawal of the piston except by unscrewing the same.

The end of the stem 12ᵇ is provided with a transverse hole 12ᵈ. The end of the piston 13 is provided with a transverse hole 13ᶠ adapted to register with the hole 12ᵈ when the parts are in the position as shown in Fig. 2. When in this position, they may be held by a holder 18 in the nature of a pincers or forceps having one straight jaw or point 18ª adapted to extend through the holes 13ᵇ and 12ᵈ. The holder 18 is provided with a cooperating curved jaw 18ᵇ to hold the device as shown in Fig. 1. When thus held, the work of drawing the ends of the severed intestine over the piston and fastening the same with purse strings, as shown in Fig. 2, is facilitated. After the ends have been thus fastened, the holder may be removed and the piston forced inwardly to telescope the cylinders and release the clasp ring, as shown in Fig. 3.

In Figs. 11 and 12, I have illustrated a side-to-side anastomosis. For example, 114 may indicate the rectum and 115, the sigmoid. In the form of device as here shown, the inner cylinder is indicated by 110, the ring by 111, the outer cylinder by 112, and the piston by 113. In the form as here shown, the extreme edge of the outer cylinder does not itself engage the ring but said cylinder is provided with an inner flange 112ª for this purpose. As here shown, the outer cylinder 112 is provided with an inwardly extending pointed finger 119. The piston 113 is provided with a bore 113ᵈ to accommodate the finger 119 when the device is closed, as shown in Fig. 12. In performing the operation, the piston is inserted through the anus, crowded through the stricture and into the sigmoid to that part to be joined to the rectum. The cylinders, partially telescoped with the rubber ring in place as shown in Fig. 11, are then inserted through the anus into the rectum and placed against the rectal wall opposite the piston until the parts are in the position shown in Fig. 11. The piston is then pressed into the cylinders to completely telescope the same, as shown in Fig. 12. This causes the rubber ring 111 to be released from the cylinder 110, whereupon it contracts over the piston 113 clasping the walls of the rectum and sigmoid under it. At the same time, the pointed finger 119 punches both walls. The peripheries of the walls around the punctures being held under the ring 111 against the piston 113 join or unite by pressure. After the ring is removed from the inner cylinder, the two cylinders may be removed at once. The piston, however, cannot be removed until after the union of the tissues has been completed.

Figs. 13 and 14 illustrate an end-to-side anastomosis or the joining of the end of a small intestine to the side of a large intestine. For example, 214 may indicate the wall of the large intestine and 215, the end of the small intestine. In the form here shown, the inner cylinder is indicated by 210, the elastic clasp ring by 211, the outer cylinder by 212 and the piston by 213. The end of the piston is provided with a groove 213ª to which the invaginated end of the small intestine may be attached by the purse string 216. The outer cylinder is provided with a pointed finger 219 adapted to puncture the side wall 214 of the large intestine when the piston is forced home into the position shown in Fig. 14. In the form here shown, the inner wall of the outer cylinder is provided with a flange 212ª to engage the ring 211 to remove the same from the inner cylinder.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A hollow inner cylinder adapted to support an elastic ring, an outer cylinder adapted to be telescoped over the inner cylinder to remove the ring therefrom, and a hollow piston adapted to carry intestinal walls and be inserted into the cylinders to engage one of said cylinders to telescope them, whereby the ring is removed from the inner cylinder and clasps the intestinal walls over the piston.

2. A device as claimed in claim 1, in which one of the cylinders is provided with a rod extending into the hollow piston.

3. A device as claimed in claim 1, in which one of the cylinders is provided with a rod extending into the hollow piston, said rod and piston being provided with spring catch mechanism to prevent removal of the rod from the piston by longitudinal movement after the same has been fully inserted into the piston.

4. A device as claimed in claim 1, in which one of the cylinders is provided with a rod adapted to be partially inserted into the piston, said rod and piston being provided with transversely arranged registering holes adapted to receive the straight jaw of a holder.

5. Apparatus as claimed in claim 1, in which one of the cylinders is provided with an inwardly extending point adapted to enter the piston when the same is pressed into the cylinders, said point adapted to puncture an intestinal wall extending over the end of the piston.

JOSEPH B. BACON.